US008924131B2

(12) United States Patent
Kowalkowski et al.

(10) Patent No.: US 8,924,131 B2
(45) Date of Patent: Dec. 30, 2014

(54) METHOD AND APPARATUS FOR CONTROLLING A DIAGNOSTIC MODULE FOR AN EXHAUST GAS SENSOR

(75) Inventors: Janean E. Kowalkowski, Northville, MI (US); Jason J. Chung, Brighton, MI (US); Scott T. Feldmann, South Lyon, MI (US); Chad E. Marlett, Plymouth, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 413 days.

(21) Appl. No.: 13/479,747

(22) Filed: May 24, 2012

(65) Prior Publication Data

US 2013/0317727 A1 Nov. 28, 2013

(51) Int. Cl.
*B60T 7/12* (2006.01)

(52) U.S. Cl.
USPC .......................... 701/104; 701/114; 73/114.45

(58) Field of Classification Search
CPC ....................... F02D 41/2467; F02D 2200/101
USPC ................. 701/101, 103–105, 110, 112, 114; 73/114.45
See application file for complete search history.

(56) References Cited

U.S. PATENT DOCUMENTS 4,123,999 A * 11/1978 Asano .......................... 123/679
4,174,682 A * 11/1979 Drews et al. ................. 123/682
4,383,515 A * 5/1983 Higashiyama et al. ....... 123/692
4,385,596 A * 5/1983 Hosaka ......................... 123/682
4,996,965 A * 3/1991 Onari et al. .................. 123/492
5,505,671 A 4/1996 Streib et al.
5,572,971 A 11/1996 Yokoyama
6,010,615 A 1/2000 Kato et al.
6,126,902 A 10/2000 Kunimoto et al.
6,957,562 B2 10/2005 Anilovich et al.
7,142,976 B2 * 11/2006 Inoue et al. .................. 701/114
2011/0066348 A1 3/2011 Grubb
2011/0100842 A1 5/2011 Handler
2011/0202253 A1 * 8/2011 Perry et al. .................... 701/102

FOREIGN PATENT DOCUMENTS

JP 2009257888 A 11/2009

* cited by examiner

*Primary Examiner* — John Kwon
(74) *Attorney, Agent, or Firm* — Quinn Law Group, PLLC

(57) ABSTRACT

A method and apparatus for controlling a diagnostic module for an exhaust gas sensor in a vehicle is provided. The exhaust gas sensor is located in an exhaust pathway in the vehicle. The diagnostic module may be configured to perform a signal range verification of an oxygen sensor portion of the exhaust gas sensor. A controller is operatively connected to the exhaust gas sensor and to the vehicle engine. The controller disables the diagnostic module when one or more entry conditions are satisfied. The entry conditions may include requiring the engine speed to be greater than a fuel cut-off threshold, the fuel cut-off threshold being the engine speed at which the fuel to the engine is terminated. The entry conditions may include: no fuel being delivered to the engine; and a vehicle exhaust brake mode being activated such that the exhaust pathway from the engine is obstructed.

15 Claims, 2 Drawing Sheets

METHOD AND APPARATUS FOR CONTROLLING A DIAGNOSTIC MODULE FOR AN EXHAUST GAS SENSOR

TECHNICAL FIELD

The present invention relates to a system and method of controlling a diagnostic module for an exhaust gas sensor in a vehicle.

BACKGROUND

Exhaust gas sensors are typically used in motor vehicles to measure constituents in the exhaust gas produced by the engine. The exhaust gas may contain hydrocarbons, carbon monoxide, nitrogen oxides (NOx), oxygen and other gases. Measurements from the exhaust gas sensors aid in adjusting the operating parameters of the vehicle, such as the operating parameters that reduce hydrocarbon emissions and improve fuel economy. Diagnostic modules may be employed by the vehicle diagnostic system to ensure proper functioning of the exhaust gas sensors.

SUMMARY

A method and apparatus for controlling a diagnostic module for an exhaust gas sensor in a vehicle is provided. The exhaust gas sensor is located in an exhaust pathway in the vehicle. The diagnostic module may be configured to perform a signal range verification of an oxygen sensor portion of the exhaust gas sensor. A controller is operatively connected to the exhaust gas sensor and to the vehicle engine. The diagnostic module is enabled when one or more predefined operating parameters are met after the engine is started. The controller disables the diagnostic module when one or more entry conditions are satisfied. The controller re-enables the diagnostic module when the entry conditions are no longer satisfied.

The entry conditions may include requiring the engine speed to be greater than a fuel cut-off threshold, the fuel cut-off threshold being the engine speed at which the fuel to the engine is terminated. Another entry condition may be that no fuel is being delivered to the engine and/or a vehicle exhaust brake mode being activated such that the exhaust pathway from the engine is obstructed. Another entry condition may be that a vehicle tow/haul mode is activated and/or a vehicle transmission is shifted from a third gear to a second gear.

The above features and advantages and other features and advantages of the present invention are readily apparent from the following detailed description of the best modes for carrying out the invention when taken in connection with the accompanying drawings.

DETAILED DESCRIPTION

Figure 1:
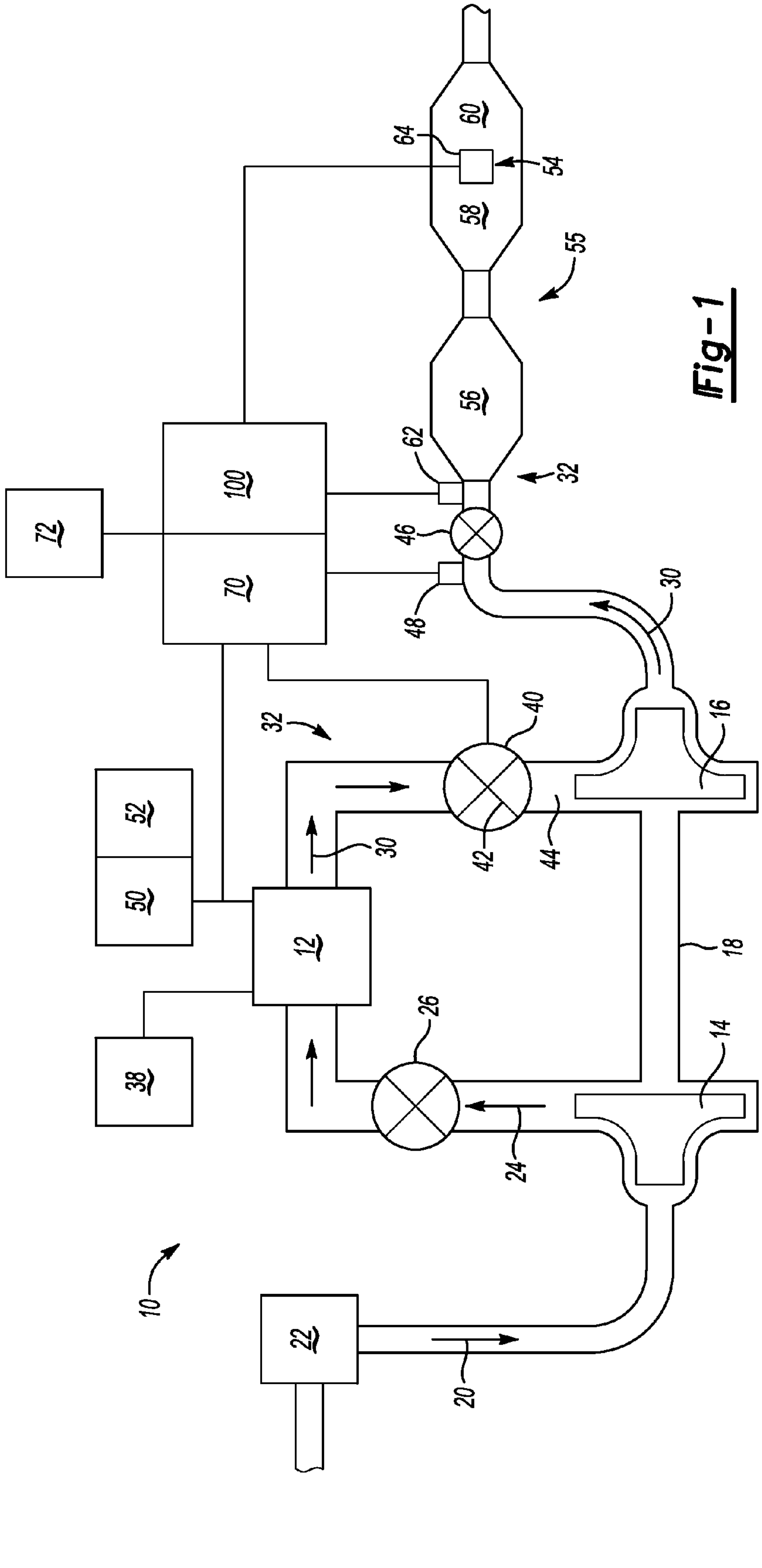
FIG. 1 is a schematic illustration of a vehicle having an exhaust gas sensor in an aftertreatment system and a controller which uses an algorithm as set forth herein to control a diagnostic module for the exhaust gas sensor.

Referring to the drawings, wherein like reference numbers correspond to like or similar components throughout the several figures, a vehicle 10 having an internal combustion engine 12 is shown in FIG. 1. The vehicle 10 includes a compressor 14 driven by a turbine 16 via a turbocharger shaft 18. Referring to FIG. 1, the compressor 14 receives an intake fluid 20 from an intake filter 22. The compressor 14 is configured to compress the intake fluid 20 to produce a stream of compressed fluid 24. An intake throttle valve 26 may be employed to modulate the mass flow rate of the intake fluid 20. The engine 12 receives the compressed fluid 24 and may combine it with fuel to produce an engine working fluid for compression and expansion in at least one chamber (not shown) in the engine 12. Various chemical compounds are formed during the combustion process in the engine 12, including carbon dioxide, water, carbon monoxide, oxides of nitrogen such as NO and $NO_2$ (referred to herein collectively as "NOx"), unburned hydrocarbons, sulfur oxides, and other compounds. The engine 12 produces an exhaust gas 30 (including these compounds) that is released to an exhaust pathway 32. The engine 12 is connected to a transmission 38.

Referring to FIG. 1, the turbine 16 is positioned through a variable turbine nozzle 40 to receive at least a portion of the exhaust gas 30. The turbine 16 is configured to extract work from the exhaust gas 30 in order to drive the compressor 14 via the turbocharger shaft 18. Referring to FIG. 1, the variable turbine nozzle 40 includes a plurality of movable vanes 42 arranged about an inlet 44 of the turbine 16. The variable turbine nozzle 40 is configured to be modulated in order to meet one or more control specifications. The variable turbine nozzle 40 may be configured to variably control an opening area about the inlet 44 between the vanes 42, depending on engine operating conditions. By way of non-limiting examples, the variable turbine nozzle 40 may include vanes 42 that rotate or slide, or stationary vanes 42 where an axial width of the inlet 44 is selectively blocked as known by those skilled in the art.

Referring to FIG. 1, optionally, the vehicle 10 may include an exhaust valve 46 positioned in the exhaust pathway 32 and configured to restrict the passage of the exhaust gas 30 through the exhaust pathway 32. By way of a non-limiting example, the intake throttle valve 26 and exhaust valve 46 may be a butterfly valve; however any suitable type of flow restricting device may be used. An exhaust pressure sensor 48 may be positioned to detect or deduce a static pressure or a total pressure for the exhaust gas 30.

Referring to FIG. 1, the engine 12 may include an exhaust brake mode 50 that may be selectively operated by a user, for example, by pressing a button in the dashboard. The exhaust brake mode 50 operates by obstructing the exhaust pathway 32 from the engine 12 in order to reduce the vehicle speed without having to use the regular service brakes (not shown). Referring to FIG. 1, the exhaust brake mode 50 may be controlled by modulating the variable turbine nozzle 40, i.e., activating the exhaust brake mode 50 by moving the turbine blades or vanes 42 to a substantially closed position. Optionally, the exhaust brake mode 50 may be controlled by modulating the exhaust valve 46 in order to substantially restrict the flow of exhaust gas 30.

Referring to FIG. 1, the engine 12 may include a tow/haul mode 52 that may be selectively operated by a user (such as by pressing a button in the dashboard). The tow/haul mode 52 may be selectively engaged when the vehicle 10 is towing a heavy load. By way of a non-limiting example, the tow/haul mode 52 may boost torque by changing the shift patterns in the vehicle transmission 38.

Figure 3:
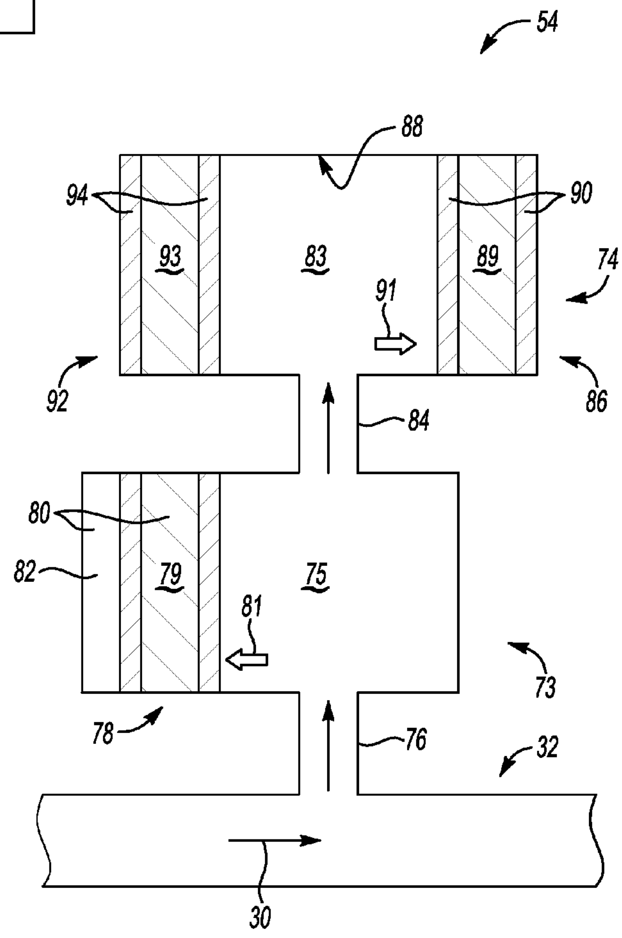
FIG. 3 is a schematic sectional illustration of the exhaust gas sensor shown in FIG. 1.

As noted above, the exhaust gas 30 includes various compounds such as oxygen and oxides of nitrogen, e.g., NO and $NO_2$, (referred to herein collectively as "NOx") formed during the combustion process. Referring to FIG. 1, the exhaust pathway 32 includes one or more exhaust gas sensors 54 configured to generate signals indicating the oxygen content and the NOx content in the exhaust gas 30. A detailed schematic illustration of an exhaust gas sensor 54 is shown in FIG. 3 and described below.

Referring to FIG. 1, the vehicle 10 includes an aftertreatment system 55 that reduces exhaust emissions by chemically converting the exhaust gas 30 into carbon dioxide, nitrogen, and water. The aftertreatment system 55 may include: an oxidation catalyst 56 for oxidizing hydrocarbon emissions in the exhaust gas 30 to other compounds; a NOx reduction device 58 that reduces the NOx in the exhaust gas 30 by conversion to nitrogen; and a particulate filter 60 to remove particulate matter or soot in the exhaust gas 30. Referring to FIG. 1, the illustrated embodiment includes two exhaust gas sensors: a first exhaust gas sensor 62 positioned at an engine outlet upstream of the NOx reduction device 58, and a second exhaust gas sensor 64 positioned downstream of the NOx reduction device 58.

A controller 70 is operatively connected to the engine 12 and the exhaust gas sensor 54. Controller 70 is adapted to execute a diagnostic module 72 for the exhaust gas sensor 54. In the embodiment shown, diagnostic module 72 is configured to perform a signal range verification of an oxygen sensor portion 75 (described below and shown in FIG. 3) of the exhaust gas sensor 54. In the signal range verification, the diagnostic module 72 checks that the signal generated by the oxygen sensor portion 75 falls within a predefined maximum and minimum value. If the signal falls within the predefined boundaries, the diagnostic module 72 generally does nothing. If not, the diagnostic module 72 generally displays an error message. The diagnostic module 72 may also be configured to check other functions of the exhaust gas sensor 54.

Controller 70 optimizes the function of the diagnostic module 72 in part by executing an algorithm 100 which resides within the controller 70 or is otherwise readily executable by the controller 70. Controller 70 may include one or more digital computers or data processing devices, each having one or more microprocessors or memory devices capable of executing the algorithm 100 and other devices connected to the controller 70. Execution of algorithm 100 as described below with reference to FIG. 2.

Figure 2:
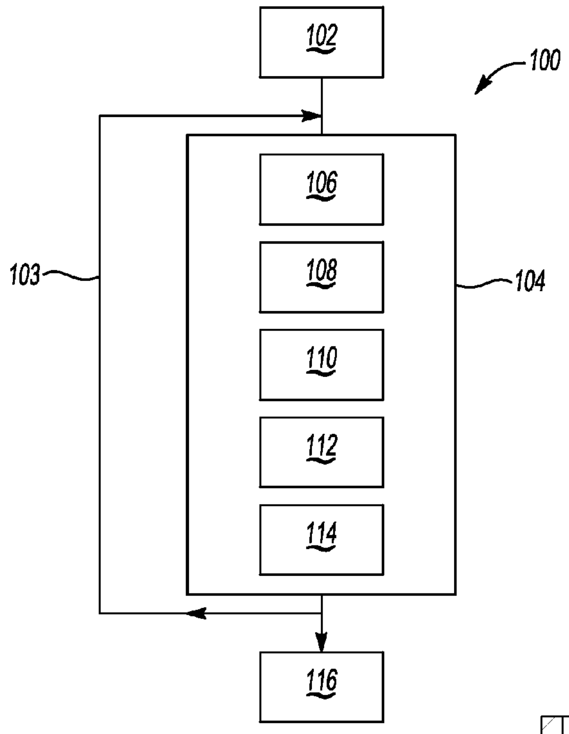
FIG. 2 is a flow chart describing a method for controlling a diagnostic module for the exhaust gas sensor shown in FIG. 1.

Algorithm 100 may begin with step 102, wherein the controller 70 of FIG. 1 determines whether one or more predefined operating parameters are met for enablement of the diagnostic module 72 when the engine 12 is started or powered. For example, the operating parameter may be that the engine 12 has been at idle speed for a minimum time, e.g., 10 seconds. Another operating parameter may be that the exhaust gas sensor 54 has been active for a minimum time. In one example, the exhaust gas sensor 54 is considered active upon reaching a threshold temperature. Referring to FIG. 2, once the operating parameters are met, algorithm 100 enables the diagnostic module 72 and proceeds to step 104.

Referring to FIG. 2, at step 104, controller 70 determines whether one or more entry conditions are satisfied. If the entry conditions are satisfied, the algorithm 100 proceeds to step 116 where controller 70 disables the execution of the diagnostic module 72. If the entry conditions are not satisfied, the algorithm 100 proceeds back to step 102, as indicated by line 103. FIG. 2 illustrates first through fifth entry conditions 106, 108, 110, 112 and 114 (described below). Any combination of the entry conditions 106, 108, 110, 112 and 114 may be employed for a particular application. In other words, a particular application may include just one or two of the listed entry conditions.

In a first embodiment, the diagnostic module 72 is disabled when the first entry condition 106 is satisfied and re-enabled when the first entry condition 106 is no longer satisfied. In a second embodiment, the diagnostic module 72 is disabled when the first, second and third entry conditions 106, 108 and 110 are satisfied and re-enabled when any one of the first, second and third entry conditions 106, 108 and 110 is no longer satisfied.

In a third embodiment, the diagnostic module 72 is disabled when each of the first through the fifth entry conditions 106, 108, 110, 112 and 114 are satisfied and re-enabled when any one of the first through the fifth entry conditions 106, 108, 110, 112 and 114 is no longer satisfied.

The first entry condition 106 is satisfied when the engine speed of the engine 12 is greater than a fuel cut-off threshold, the fuel cut-off threshold being the engine speed at which the fuel to the engine 12 is terminated. In one example, the fuel cut-off threshold is 3400 rpm. The second entry condition 108 is satisfied when no fuel is being delivered to the engine 12.

The third entry condition 110 is satisfied when the exhaust brake mode 50 (shown in FIG. 1 and described above) is activated such that flow of the exhaust gas 30 through the exhaust pathway 32 is obstructed or blocked. The fourth entry condition 112 is satisfied when the vehicle tow/haul mode 52 (shown in FIG. 1 and described above) is activated. The fifth entry condition 114 is satisfied when the vehicle transmission 38 (shown in FIG. 1) is shifted from a third gear to a second gear.

In summary, controller 70 disables the diagnostic module 72 when one or more entry conditions are satisfied and will re-enable them when any of the entry conditions are no longer satisfied. It is within the scope of the present disclosure that the controller 70 employed may eliminate one or more steps or entry conditions or may determine the steps in an order other than as described above. The engine 12 may be a compression-ignition engine such as a diesel engine, or any other type of engine that uses a diagnostic module 72.

Referring now to FIG. 3, a schematic sectional illustration of an exhaust gas sensor 54 according to one embodiment is shown. The exhaust gas sensor 54 may include an oxygen sensor portion 73 (also referred to as a lambda sensor) and a NOx sensor portion 74.

Referring to FIG. 3, exhaust gas 30 flows from the exhaust pathway 32 to a first chamber 75 through a first passage 76. A first pump 78 is operatively connected to the first chamber 74 and configured to measure the relative oxygen content in the exhaust gas 30 (relative to a reference gas such as atmospheric air). The first pump 78 may include a first membrane 79 placed between electrodes 80. The first membrane 79 is oxygen-permeable such that applying an electromotive force across the electrodes 80 induces the underlying oxygen 81 in the exhaust gas 30 to flow across the first membrane 79, generating a signal/current proportional to the relative oxygen content in the exhaust gas 30. The first pump 78 may include a space 82 in which a reference gas is introduced as a calibration for the signal generated.

Referring to FIG. 3, the exhaust gas 30 flows from the first chamber 75 to a second chamber 83 through a second passage 84. A second pump 86 is operatively connected to the second chamber 83 and determines the relative NOx content of the exhaust gas 30. A catalyst 88 is located in the second chamber 83 and configured to reduce the oxides of nitrogen (NOx) in the exhaust gas 30, thereby producing nitrogen and generated oxygen 91. The generated oxygen 91 is measured by the second pump 86 via a second membrane 89 and electrodes 90. The generated oxygen 91 represents the NOx content of the exhaust gas 30 because the underlying oxygen 81 in the exhaust gas 30 was removed in the first chamber 75 by the first pump 78.

Referring to FIG. 3, the first and second passages 76, 84 are configured to provide predetermined diffusion resistance to the exhaust gas 30 introduced into the first and second chambers 74, 82, respectively. By way of a non-limiting example, the first and second passages 76, 84 may be composed of a porous material such as zirconium oxide. Alternatively, the first and second passages 76, 84 may be configured as a small slit or hole of a predetermined cross-sectional area.

Referring to FIG. 3, an auxiliary pump 92 may be operatively connected to the second chamber 83 and configured to maintain a fixed oxygen concentration in the second chamber 83. For example, the auxiliary pump 92 may maintain an oxygen concentration of 100 parts per million. The auxiliary pump 92 may include a third membrane 93 placed between electrodes 94. By way of a non-limiting example, the first, second and third membranes 79, 89, 93 may be composed of a zirconia ceramic and the electrodes 80, 90, 94 may be composed of platinum. The specific configuration of the exhaust gas sensor 54 may be varied according to the particular application.

The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims.

The invention claimed is:

1. A vehicle comprising:
- an internal combustion engine having an exhaust pathway configured for flow of an exhaust gas;
- wherein the engine is capable of receiving fuel and defines an engine speed;
- at least one exhaust gas sensor located in the exhaust pathway;
- a controller operatively connected to the exhaust gas sensor and to the engine;
- a diagnostic module for the exhaust gas sensor, the diagnostic module being enabled when one or more predefined operating parameters are met;
- wherein the controller disables the diagnostic module when one or more entry conditions are satisfied; and
- wherein the entry conditions include the engine speed being greater than a fuel cut-off threshold, the fuel cut-off threshold being the engine speed at which the fuel to the engine is terminated.

2. The vehicle of claim 1, wherein the diagnostic module is configured to perform a signal range verification of an oxygen sensor portion of the exhaust gas sensor.

3. The vehicle of claim 1, wherein the fuel cut-off threshold is 3400 rpm.

4. The vehicle of claim 1, wherein the entry conditions further include:
- a vehicle exhaust brake mode having movable vanes being activated such that the movable vanes are substantially closed, thereby obstructing the exhaust pathway from the engine; and
- no fuel being delivered to the engine.

5. The vehicle of claim 1, wherein the controller re-enables the diagnostic module when any of the one or more entry conditions is no longer satisfied.

6. The vehicle of claim 1, wherein:
- the exhaust gas includes oxygen and oxides of nitrogen (NOx); and
- the exhaust gas sensor includes:
  - a first chamber fluidly connected to the exhaust pathway such that the exhaust gas flows from the exhaust pathway to the first chamber through a first passage; and
  - a first pump operatively connected to the first chamber and configured to measure a relative amount of the oxygen in the exhaust gas.

7. The vehicle of claim 6, wherein the exhaust gas sensor includes:
- a second chamber fluidly connected to the first chamber such that the exhaust gas flows from the first chamber to the second chamber through a second passage; and
- a second pump operatively connected to the second chamber and configured to measure a relative amount of the NOx in the exhaust gas.

8. The vehicle of claim 7, wherein the first and second passages are configured to provide predetermined diffusion resistance to the exhaust gas flowing into the first and second chambers, respectively.

9. A vehicle comprising:
- an internal combustion engine having an exhaust pathway and defining an engine speed, the engine being capable of receiving fuel;
- at least one exhaust gas sensor located in the exhaust pathway;
- a controller operatively connected to the exhaust gas sensor and to the engine;
- a diagnostic module executable by the controller, the diagnostic module being configured to perform a signal range verification of an oxygen sensor portion of the exhaust gas sensor;
- wherein the controller disables the diagnostic module when one or more entry conditions are satisfied; and
- wherein the entry conditions include:
  - the engine speed being greater than a fuel cut-off threshold, the fuel cut-off threshold being the engine speed at which the fuel to the engine is terminated;
  - no fuel being delivered to the engine; and
  - a vehicle exhaust brake mode being activated such that the exhaust pathway from the engine is obstructed.

10. The vehicle of claim 9, wherein the entry conditions further include:
- a vehicle tow/haul mode being activated; and
- a vehicle transmission being shifted from a third gear to a second gear.

11. The vehicle of claim 9, wherein the controller re-enables the diagnostic module when each of the entry conditions is no longer satisfied.

12. A method for controlling a diagnostic module for an exhaust gas sensor in a vehicle, the method comprising:
- positioning the exhaust gas sensor in an exhaust pathway of the vehicle;
- enabling the diagnostic module when one or more predefined operating parameters are met, wherein the diagnostic module is configured to perform a signal range verification of an oxygen sensor portion of the exhaust gas sensor;
- disabling the exhaust gas sensor when one or more entry conditions is satisfied; and
- re-enabling the exhaust gas sensor diagnostic module when any of the one or more entry conditions is no longer satisfied.

13. The vehicle of claim 12, wherein the entry conditions include the engine speed being greater than a fuel cut-off threshold, the fuel cut-off threshold being the engine speed at which the fuel to the engine is terminated.

14. The vehicle of claim 12, wherein the entry conditions include:

the engine speed being greater than a fuel cut-off threshold, the fuel cut-off threshold being the engine speed at which the fuel to the engine is terminated;

no fuel being delivered to the engine; and a vehicle exhaust brake mode being activated such that the exhaust pathway from the engine is obstructed.

15. The vehicle of claim 14, wherein the entry conditions further include:

a vehicle tow/haul mode being activated; and a vehicle transmission being shifted from a third gear to a second gear.

* * * * *